United States Patent
Fengler

(10) Patent No.: US 10,538,324 B2
(45) Date of Patent: Jan. 21, 2020

(54) SAFETY DEVICE AND SAFETY METHOD FOR AN AIRCRAFT, AND AIRCRAFT COMPRISING THE SAFETY DEVICE

(71) Applicant: METEOMATICS GmbH, St. Gallen (CH)

(72) Inventor: Martin Johannes Fengler, St. Gallen (CH)

(73) Assignee: METEOMATICS GMBH, St. Gallen (CH)

( * ) Notice: Subject to any disclaimer, the term of this patent is extended or adjusted under 35 U.S.C. 154(b) by 0 days.

(21) Appl. No.: 14/838,187

(22) Filed: Aug. 27, 2015

(65) Prior Publication Data

US 2016/0062363 A1    Mar. 3, 2016

(30) Foreign Application Priority Data

Aug. 28, 2014    (DE) .......................... 10 2014 217 196

(51) Int. Cl.
*B64C 39/02*    (2006.01)
*G05D 1/00*    (2006.01)

(52) U.S. Cl.
CPC .......... *B64C 39/024* (2013.01); *G05D 1/0055* (2013.01); *B64C 2201/024* (2013.01); *B64C 2201/125* (2013.01); *B64C 2201/145* (2013.01)

(58) Field of Classification Search
CPC ............ B64C 39/024; B64C 2201/125; B64C 2201/024; B64C 2201/145; G05D 1/0055
See application file for complete search history.

(56) References Cited

U.S. PATENT DOCUMENTS

| 4,108,402 A | * | 8/1978 | Bowen | ................... B64D 17/80 244/102 R |
| 4,839,658 A | * | 6/1989 | Kathol | ................. G08G 5/0013 342/29 |

(Continued)

FOREIGN PATENT DOCUMENTS

| DE |     100 26 469 C1 | 1/2002 |
| DE | 10 2007 032 084 A1 | 1/2009 |
| DE | 10 2008 020 534 A1 | 10/2009 |

OTHER PUBLICATIONS

Examination Report dated Jun. 26, 2015 corresponding to German Patent Application No. 10 2014 217 196.2.

*Primary Examiner* — Jeffrey C Boomer
(74) *Attorney, Agent, or Firm* — Squire Patton Boggs (US) LLP

(57) ABSTRACT

For reducing a risk potential of an aircraft, a safety device for the aircraft is provided, said aircraft having a flight control device for flight control of the aircraft based on global position coordinates and/or flight altitude values of the aircraft detected by a sensor apparatus of the flight control device. The safety device comprises a flight altitude detection apparatus configured to detect a current flight altitude of the aircraft independently of the sensor apparatus, a determination apparatus configured to determine whether the current flight altitude of the aircraft detected by the flight altitude detection apparatus exceeds a predetermined maximum altitude, and a rescue apparatus configured to interrupt the flight control of the aircraft when the current flight altitude of the aircraft detected by the flight altitude detection apparatus exceeds the predetermined maximum altitude.

12 Claims, 4 Drawing Sheets

(56) References Cited

U.S. PATENT DOCUMENTS

| | | | | |
|---|---|---|---|---|
| 6,313,791 B1* | 11/2001 | Klanke | B60R 25/018 | 342/357.75 |
| 6,685,140 B2 | 2/2004 | Carroll | | |
| 8,234,020 B1* | 7/2012 | Wichgers | G08G 5/0086 | 701/9 |
| 9,805,607 B2* | 10/2017 | Gong | G08G 5/006 | |
| 2001/0048050 A1* | 12/2001 | Grieser | B64D 17/80 | 244/152 |
| 2003/0057327 A1* | 3/2003 | Carroll | B64C 39/024 | 244/139 |
| 2004/0186635 A1* | 9/2004 | Manfred | G01C 25/005 | 701/4 |
| 2008/0172148 A1* | 7/2008 | Isorce | G05D 1/0646 | 701/9 |
| 2009/0027253 A1* | 1/2009 | van Tooren | G01S 13/9303 | 342/29 |
| 2009/0219204 A1* | 9/2009 | Yoo | G01S 19/33 | 342/357.27 |
| 2010/0174426 A1* | 7/2010 | Turung | G05D 1/0061 | 701/11 |
| 2010/0231447 A1* | 9/2010 | Fischer | G01S 19/05 | 342/357.44 |
| 2010/0292871 A1* | 11/2010 | Schultz | G01C 21/00 | 701/3 |
| 2011/0202206 A1* | 8/2011 | Karthikeyan | G01C 23/00 | 701/3 |
| 2012/0004846 A1* | 1/2012 | Coatantiec | G01C 21/165 | 701/470 |
| 2012/0138319 A1* | 6/2012 | Demmitt | A62C 3/025 | 169/28 |
| 2012/0150426 A1* | 6/2012 | Conway | G08G 5/0026 | 701/120 |
| 2013/0060406 A1* | 3/2013 | Christensen | G05D 1/0858 | 701/4 |
| 2014/0032034 A1* | 1/2014 | Raptopoulos | G08G 5/0069 | 701/25 |
| 2014/0097984 A1* | 4/2014 | Stevens | G01S 19/20 | 342/357.58 |
| 2014/0197981 A1* | 7/2014 | Hartley | G01S 13/74 | 342/37 |
| 2014/0249693 A1* | 9/2014 | Stark | B64C 39/024 | 701/2 |
| 2014/0350750 A1* | 11/2014 | Burch | B64C 19/00 | 701/2 |
| 2015/0081140 A1* | 3/2015 | Moune | B64C 13/18 | 701/3 |
| 2015/0254989 A1* | 9/2015 | Kozlow | G08G 5/0039 | 701/466 |
| 2015/0348424 A1* | 12/2015 | Duffy | G08G 5/0013 | 701/2 |
| 2015/0353196 A1* | 12/2015 | van Cruyningen | B64C 39/024 | 701/2 |
| 2015/0367950 A1* | 12/2015 | Rajashekara | B64C 11/305 | 701/3 |
| 2015/0369601 A1* | 12/2015 | Egberg | G01C 25/00 | 73/1.57 |
| 2016/0275801 A1* | 9/2016 | Kopardekar | G08G 5/0043 | |
| 2017/0278409 A1* | 9/2017 | Johnson | G08G 5/0069 | |

* cited by examiner

SAFETY DEVICE AND SAFETY METHOD FOR AN AIRCRAFT, AND AIRCRAFT COMPRISING THE SAFETY DEVICE

CROSS REFERENCE TO RELATED APPLICATIONS

This application claims foreign priority to DE 10 2014 217 196.2 filed Aug. 28, 2014, under 35 U.S.C. § 119, the entire contents of which are incorporated herein by reference thereto.

BACKGROUND

It is known to provide aircraft, particularly unmanned aircraft, with an automatic flight control such as an autopilot. It is further known to assign an air corridor to such aircraft, said corridor e.g. corresponding to a reserved airspace. So as to remain in the reserved or assigned airspace, an automatic flight control can be provided with sensors determining a flight altitude and/or a global position (e.g. with a satellite navigation system being used) of the aircraft in order to control the aircraft within the assigned airspace on the basis of the sensor data.

In particular, such a restriction to an assigned airspace may result from requirements of the aviation law to be met. For instance, an aircraft to which a cylindrical airspace has been assigned may on no account leave this airspace upwards as, there, other air traffic may take place and may otherwise be adversely affected by the aircraft.

When errors occur in the automatic flight control, the aircraft may leave the assigned airspace and may e.g. have an adverse effect on air traffic, which could entail serious damage.

Examples of such errors are defective sensors, calculation errors and defective signals of a satellite navigation system used.

Therefore, the invention indicated in claim 1 is based on the object of preventing leaving the assigned airspace when errors occur in the automatic flight control, thereby reducing a risk potential of an aircraft.

SUMMARY OF THE INVENTION

The problem is solved by the features indicated in claim 1, particularly by a safety device for an aircraft having a flight control device for flight control of the aircraft based on global position coordinates and/or flight altitude values of the aircraft detected by a sensor apparatus of the flight control device. The safety device comprises a flight altitude detection apparatus configured to detect a current flight altitude of the aircraft independently of the sensor apparatus, a determination apparatus configured to determine whether the current flight altitude of the aircraft detected by the flight altitude detection apparatus exceeds a predetermined maximum altitude, and a rescue apparatus configured to interrupt the flight control of the aircraft when the current flight altitude of the aircraft detected by the flight altitude detection apparatus exceeds the predetermined maximum altitude.

The advantages achieved by the invention and particularly by the use of independently determined altitude values particularly consist in that it can be avoided that the aircraft leaves its assigned airspace upwards due to errors in the flight control.

According to an advantageous embodiment of the invention, the safety device further comprises a global position detection apparatus configured to detect a current global position of the aircraft independently of the sensor apparatus. The determination apparatus according to the invention is further configured to determine whether a difference between the global position coordinates detected by the sensor apparatus of the flight control device and the current global position of the aircraft detected by the global position detection apparatus exceeds a predetermined difference value. The rescue apparatus according to the invention is further configured to interrupt the flight control of the aircraft when the difference between the global position coordinates detected by the sensor apparatus of the flight control device and the current global position of the aircraft detected by the global position detection apparatus exceeds the predetermined difference value.

This makes it possible to recognize errors in the flight control which may cause, in particular, that the aircraft leaves the assigned airspace in arbitrary directions and to react such that the aircraft cannot leave the assigned airspace.

According to a further advantageous embodiment of the invention, the determination apparatus is further configured to determine whether the current global position detected by the global position detection apparatus is outside a first predetermined space. The safety device according to the invention further comprises an output device configured to output an instruction to the flight control device to control the aircraft into the first predetermined space when the current global position detected by the global position detection apparatus is outside the first predetermined space.

In this way, already a trend towards leaving an assigned airspace can be detected, and said trend may already be countered prior to the airspace being actually left.

According to a further advantageous embodiment of the invention, the determination apparatus according to the invention is further configured to determine whether the current global position detected by the global position detection apparatus is outside a second predetermined space incorporating the first predetermined space. The rescue apparatus according to the invention is further configured to interrupt the flight control of the aircraft when the current global position detected by the global position detection apparatus is outside the second predetermined space.

In this way, a further deviation of the aircraft from the assigned airspace after actually leaving the same can be avoided.

According to a further advantageous embodiment of the invention, the first and/or the second predetermined space is a cylindrical airspace defined by an altitude and a diameter.

According to a further advantageous embodiment of the invention, the global position detection apparatus uses a satellite navigation system which differs from a satellite navigation system used by the sensor apparatus. Examples of such satellite navigation systems are GPS, Galileo, GLONASS and BeiDou.

This makes it possible to react appropriately to deviations caused by defective signals of a specific satellite navigation system or by defective calculations based on the specific satellite navigation system (e.g. due to a defective hardware assigned to the specific navigation system).

According to a further advantageous embodiment of the invention, the safety device according to the invention further comprises a power supply which is independent of a power supply of the flight control device.

This makes it possible to react appropriately to deviations caused by a defective power supply (overvoltage, undervoltage, voltage failure) of the automatic flight control.

According to a further advantageous embodiment of the invention, the flight altitude detection apparatus is an air pressure sensor.

According to a further advantageous embodiment of the invention, the rescue apparatus according to the invention is configured to interrupt the flight control of the aircraft by switching off the flight control device and/or by switching off a primary drive of the aircraft.

According to a further advantageous embodiment of the invention, the rescue apparatus according to the invention is further configured to activate, after the flight control of the aircraft has been interrupted, a parachute of the aircraft for a controlled landing of the aircraft.

The above-described problem is also solved by the features indicated in claim 10, particularly by a safety method for an aircraft having a flight control device for flight control of the aircraft based on global position coordinates and/or flight altitude values of the aircraft detected by a sensor apparatus of the flight control device. Said safety method comprises detecting a current flight altitude of the aircraft independently of the sensor apparatus, determining whether the detected current flight altitude of the aircraft exceeds a predetermined maximum altitude, and interrupting the flight control of the aircraft when the detected current flight altitude of the aircraft exceeds the predetermined maximum altitude.

The above-described problem is also solved by the features listed in claim 11, particularly by an aircraft comprising a flight control device for flight control of the aircraft based on global position coordinates and/or flight altitude values of the aircraft detected by a sensor apparatus of the flight control device, and the safety device according to the invention.

BRIEF DESCRIPTION OF THE DRAWINGS

One embodiment of the invention is shown in the drawing and will be described in greater detail below.

There.

DETAILED DESCRIPTION

Figure 1:
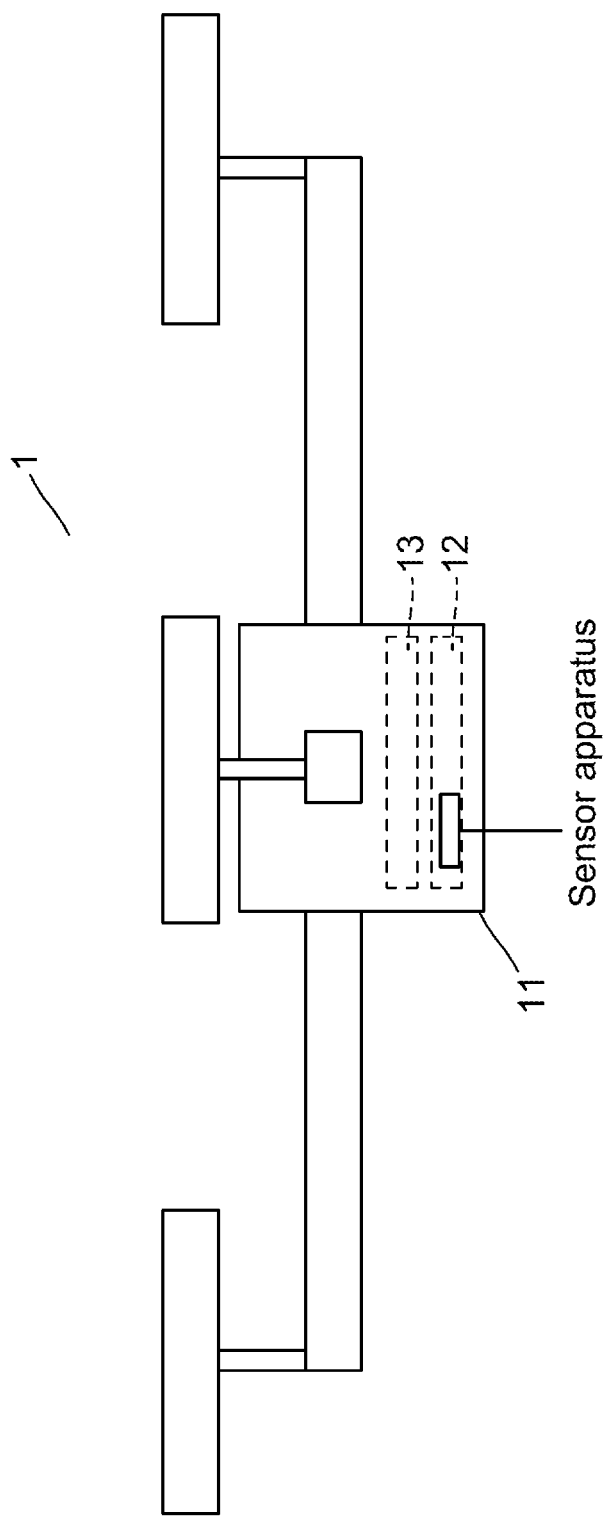
FIG. 1 schematically shows an aircraft in which the present invention is used.

FIG. 1 schematically shows an aircraft 1. In particular, FIG. 1 shows a drone in the form of a quadrocopter.

The aircraft 1 comprises a main body or casing 11. The aircraft 1 further comprises a flight control device 12 as well as a safety device 13 according to the invention.

In FIG. 1, the flight control device 12 and the safety device 13 according to the invention are shown as being accommodated in the casing 11. It shall be remarked here that the flight control device 12 as well as the safety device 13 according to the invention, or only one of the two, respectively, may also be arranged outside the main body or casing 11, and does/do not have to be positioned in any casing.

The flight device 1 in FIG. 1 could be a meteodrone, i.e. a drone used for meteorological purposes. The aircraft 1 is, however, not restricted to such a meteodrone.

One application scenario of such an aircraft 1 (especially in the case of a meteodrone) could be a scenario where the aircraft basically flies up and down. Such an example of an application scenario is shown in FIG. 2.

Figure 2:
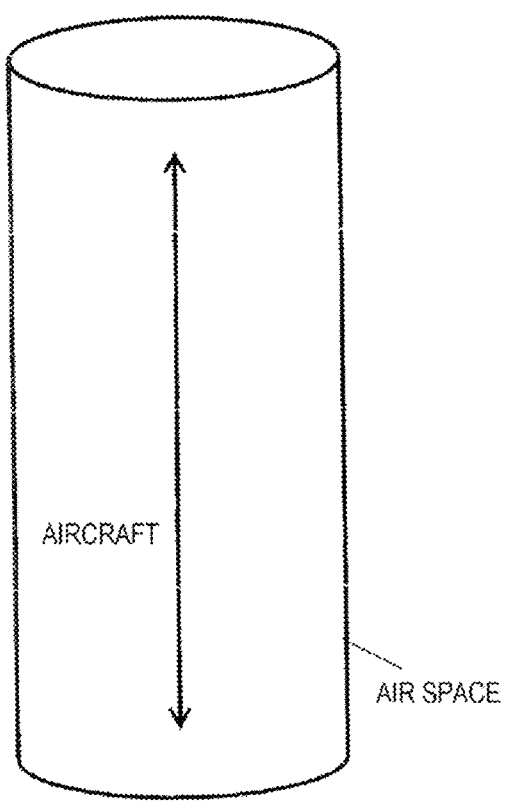
FIG. 2 schematically shows an airspace defined for an aircraft in which the present invention is used, FIG. 3 schematically shows predetermined spaces adapted to serve as limits of decision according to the invention for an aircraft in which the present invention is used.

FIG. 2 schematically shows an airspace defined for an aircraft 1, with an intended flight route being indicated by an upward/downward arrow in the center of the airspace.

The application scenario and, thus, the airspace shown in FIG. 2 as well as the intended flight route of the aircraft 1 as shown in FIG. 2 are only exemplary and not restricted thereto, but have been selected for the sake of simplicity only.

For example, the flight control device 12 (e.g. an autopilot) comprises an air-pressure sensor for determining the air pressure and, hence, for determining a flight altitude as well as a GPS receiver for the determination of a position. The sensor technology of the flight control device is, however, not restricted thereto.

Due to requirements to be met pursuant to the aviation law, it has to be ensured that the aircraft 1 does not leave a reserved airspace, e.g. one corresponding to the airspace shown in FIG. 2.

Therefore, the invention provides for a safety device 13 comprising an independent power supply (at least independent of the flight control device 12, i.e. the safety device 13 and the flight control device 12 are fed by separate power supplies). The safety device 13 further comprises an air gage/barometer (absolute or relative) adapted to determine an ambient air pressure and, hence, a flight altitude. The safety device 13 further comprises a further geo-positioning system.

On the assumption that the flight control device 12 e.g. uses GPS (Global Positioning System), the safety device 13 could e.g. use Galileo, GLONASS, or BeiDou (also BeiDou Navigation Satellite System).

Figure 4:
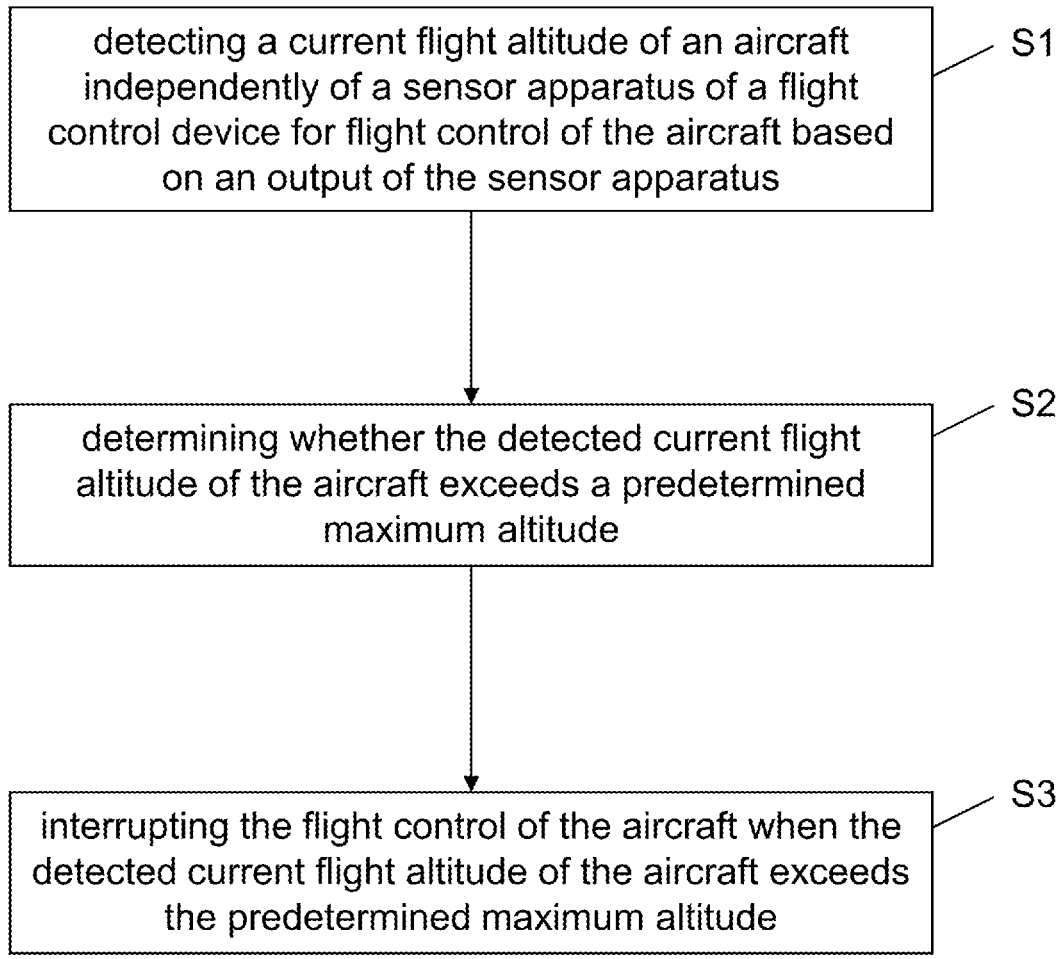
FIG. 4 is a schematic diagram of a procedure according to exemplary embodiments of the present invention.

FIG. 4 illustrates an exemplary method according to the features of claim 10.

If the safety device 13 comprises a relative air gage (step S1), this is adjusted to the starting site altitude (start altitude) upon or prior to a start. As soon as the air gage reaches the upper limit of the assigned airspace (e.g. the upper boundary surface of the cylindrical airspace shown in FIG. 2) (step S1, S2), on the assumption of a standard atmosphere, a rescue measure is implemented/initiated (step S3). This rescue measure (step S3) may e.g. comprise an interruption of the primary drive of the aircraft 1. Also, the rescue measure (step S3) may comprise switching-off the flight control device and/or cutting off a power supply feeding the aircraft (not the power supply of the safety device 13). The rescue measure (step S3) is, however, not restricted to the mentioned examples, but comprises all those measures adapted to prevent leaving the predefined airspace or moving further away from the predefined airspace and/or to allow returning into the predefined airspace.

For a safe return of the aircraft 1 to the ground or for its controlled landing, the rescue measure may comprise an activation of a parachute of the aircraft 1 subsequently to the above interruptions named by way of an example. This measure is, however, not restricted to a parachute, and may comprise any measure, such as gliding surfaces, braking devices, etc., which is adapted to ensure or favor a safe return of the aircraft 1 to the ground when the flight control is interrupted.

So as to prevent the aircraft from horizontally flying out of the predefined airspace (or flying out therefrom with a horizontal component), a navigation system which is independent of a satellite navigation system used by the autopilot (flight control device 12) is operated, as has been noted above, in the safety device 13 also designated as "kill system". That is, if the autopilot uses GPS, the safety device 13 could use Galileo or GLONASS or BeiDou. If the autopilot uses Galileo, however, the safety device 13 could use GPS, GLONASS, or BeiDou accordingly.

The safety device 13 is, for example, connected to the autopilot (flight control device 12) by means of a bus. In this way, the coordinates or navigation data of the autopilot as primary navigation device can constantly be compared or coordinated with the navigation data of the safety device 13. If unduly large differences occur between the two navigation data (i.e. a predetermined difference value is exceeded), the above-described rescue measure is immediately implemented/initiated.

Figure 3:
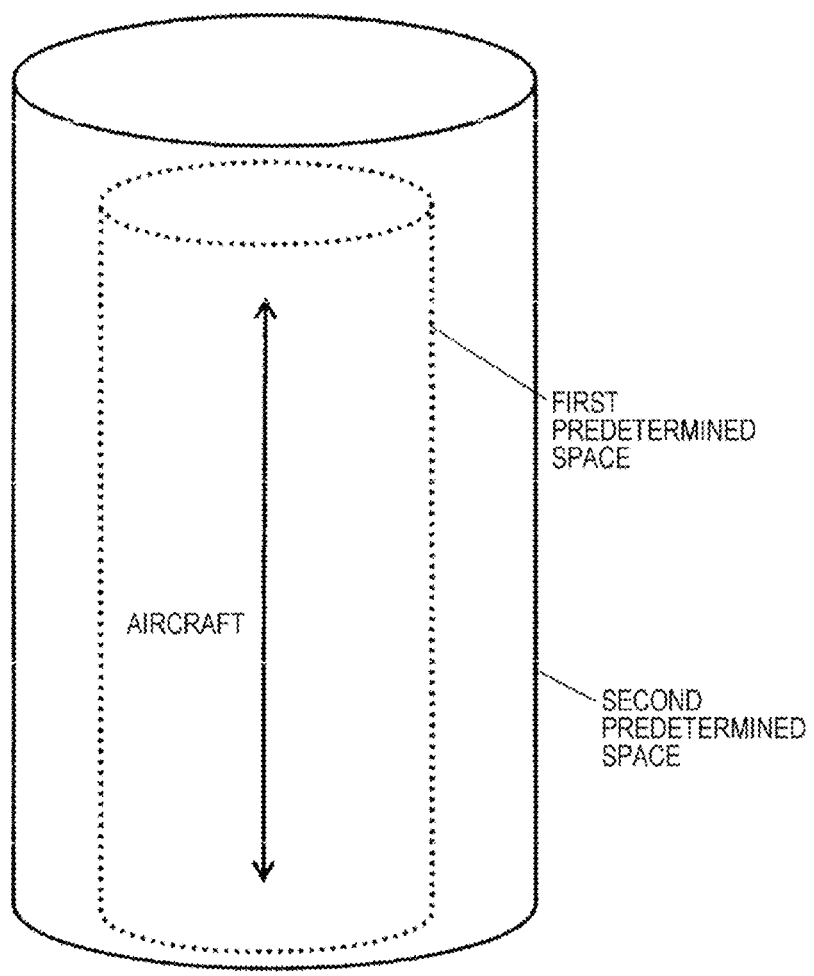

A further development of the embodiment is described by means of FIG. 3; this Figure schematically shows predetermined spaces for the aircraft 1, these spaces serving as decision limits.

In particular, FIG. 3 shows an intended flight route of the aircraft 1 by an upward/downward arrow in the center of the predetermined spaces and is, hence, illustrated by an application scenario comparable to the application scenario described in FIG. 2. However, also this further development is not restricted to the example of the application scenario.

Furthermore, FIG. 3 particularly shows a first predetermined space and a second predetermined space whose outer limits or outer envelopes serve as decision limits. The second predetermined space is larger than the first predetermined space and completely incorporates the latter. In the case of cylindrical predetermined spaces, the central axes of the respective cylinders shall preferably coincide. The arrangement of the predetermined spaces is, however, not restricted to this exemplary arrangement.

In accordance with the use thereof, the outer envelope of the first predetermined space may also be designated as "soft fence", whereas the outer envelope of the second predetermined space may also be designated as "hard fence".

When the "soft fence" is surpassed, i.e. when the first predetermined space is left, the autopilot is instructed by the safety device 13 to guide the aircraft back to the predefined course (upward/downward arrow).

When the "hard fence" is surpassed, i.e. when the second predetermined space is left, the above-described rescue measure is immediately implemented/initiated.

What is claimed is:

1. A safety device for an unmanned aircraft having a flight control device for flight control of the aircraft based on global position coordinates or flight altitude values of the aircraft detected by a sensor apparatus of the flight control device, said safety device comprising computer hardware configured to cause the safety device at least to:
   detect a current flight altitude of the aircraft independently of the sensor apparatus,
   determine whether the current flight altitude of the aircraft exceeds a predetermined maximum altitude,
   interrupt the flight control of the aircraft when the current flight altitude of the aircraft exceeds the predetermined maximum altitude, so that the aircraft returns to flying at an altitude that does not exceed the predetermined maximum altitude,
   detect a current global position of the aircraft independently of the sensor apparatus,
   determine whether the current global position is outside a first predetermined space that the aircraft is allowed to fly,
   output an instruction to the flight control device to control the aircraft to fly back into the first predetermined space when the current global position is outside the first predetermined space,
   determine whether a difference between the global position coordinates detected by the sensor apparatus of the flight control device and the current global position of the aircraft exceeds a predetermined difference value, and
   interrupt the flight control of the aircraft when the difference between the global position coordinates detected by the sensor apparatus of the flight control device and the current global position of the aircraft exceeds the predetermined difference value, by controlling the aircraft to return to flying at a position in which the difference between the global position coordinates and the current global position do not exceed the predetermined difference value,
   wherein the safety device and the flight control device each comprise a respective independent power supply, and
   wherein the computer hardware is configured to cause the safety device to interrupt the flight control device of the aircraft by cutting off the power supply of the flight control device while maintaining power of the safety device.

2. The safety device according to claim 1, wherein the computer hardware is further configured to cause the safety device to:
   determine whether the current global position is outside a second predetermined space incorporating the first predetermined space; and
   interrupt the flight control of the aircraft when the current global position is outside the second predetermined space.

3. The safety device according to claim 2, wherein the first or the second predetermined space is a cylindrical airspace defined by an altitude and a diameter.

4. The safety device according to claim 1, wherein the computer hardware is further configured to cause the safety device to use a satellite navigation system which differs from a satellite navigation system used by the sensor apparatus.

5. The safety device according to claim 1, wherein the computer hardware is further configured to cause the safety device to interrupt the flight control of the aircraft by switching off a primary drive of the aircraft.

6. The safety device according to claim 1, wherein the computer hardware is further configured to cause the safety device to activate a parachute of the aircraft for a controlled landing of the aircraft.

7. A safety method executed by a safety device for an unmanned aircraft having a flight control device for flight control of the aircraft based on global position coordinates or flight altitude values of the aircraft detected by a sensor apparatus of the flight control device, said safety method comprising:
   detecting a current flight altitude of the aircraft independently of the sensor apparatus,
   determining whether the detected current flight altitude of the aircraft exceeds a predetermined maximum altitude,
   interrupting the flight control of the aircraft when the detected current flight altitude of the aircraft exceeds the predetermined maximum altitude, so that the aircraft returns to flying at an altitude that does not exceed the predetermined maximum altitude, detecting a current global position of the aircraft independently of the sensor apparatus, determining whether the current global position is outside a first predetermined space that the aircraft is allowed to fly, outputting an instruction to the flight control device to control the aircraft to fly back into the first predetermined space when the current global position detected by the global position detection apparatus is outside the first predetermined space, determining whether a difference between global position coordinates detected by the sensor apparatus and the current global position of the aircraft exceeds a predetermined difference value, and interrupting flight control of the aircraft when the difference between the global position coordinates detected by the sensor apparatus and the current global position of the aircraft exceeds the predetermined difference value, by controlling the aircraft to return to flying at a position in which the difference between the global position coordinates and the current global position do not exceed the predetermined difference value, wherein the safety device and the flight control device each comprise a respective independent power supply, and wherein interrupting the flight control of the aircraft comprises cutting off the power supply of the flight control device while maintaining power of the safety device.

8. An unmanned aircraft comprising:
a safety device having a flight control device for flight control of the aircraft based on global position coordinates or flight altitude values of the aircraft detected by a sensor apparatus of the flight control device,
said safety device comprising computer hardware configured to cause the safety device at least to
detect a current flight altitude of the aircraft independently of the sensor apparatus,
determine whether the current flight altitude of the aircraft exceeds a predetermined maximum altitude,
interrupt the flight control of the aircraft when the current flight altitude of the aircraft exceeds the predetermined maximum altitude, so that the aircraft returns to flying at an altitude that does not exceed the predetermined maximum altitude,
detect a current global position of the aircraft independently of the sensor apparatus,
determine whether the current global position is outside a first predetermined space that the aircraft is allowed to fly, and
output an instruction to the flight control device to control the aircraft to fly back into the first predetermined space when the current global position is outside the first predetermined space,
determine whether a difference between the global position coordinates detected by the sensor apparatus of the flight control device and the current global position of the aircraft exceeds a predetermined difference value, and
interrupt the flight control of the aircraft when the difference between the global position coordinates detected by the sensor apparatus of the flight control device and the current global position of the aircraft exceeds the predetermined difference value, by controlling the aircraft to return to flying at a position in which the difference between the global position coordinates and the current global position do not exceed the predetermined difference value, wherein the safety device and the flight control device each comprise a respective independent power supply, and wherein the computer hardware is configured to cause the safety device to interrupt the flight control device of the aircraft by cutting off the power supply of the flight control device while maintaining power of the safety device.

9. A safety device for an unmanned aircraft having a flight control device, said safety device comprising:
computer hardware, the computer hardware being configured to cause the apparatus at least to:
detect a current flight altitude of an aircraft independently of an output of a sensor apparatus, wherein the sensor apparatus senses flight altitude information;
determine whether a detected current flight altitude of the aircraft exceeds a predetermined maximum altitude;
interrupt flight control of the aircraft when the detected current flight altitude of the aircraft exceeds the predetermined maximum altitude, so that the aircraft returns to flying at an altitude that does not exceed the predetermined maximum altitude;
detect a current global position of the aircraft independently of the sensor apparatus;
determine whether the current global position is outside of a first predetermined space that the aircraft is allowed to fly;
control the aircraft to fly back into the first predetermined space when the current global position detected by the global position detection apparatus is outside the first predetermined space;
determine whether a difference between global position coordinates detected by the sensor apparatus and the current global position of the aircraft exceeds a predetermined difference value; and
interrupt flight control of the aircraft when the difference between the global position coordinates detected by the sensor apparatus and the current global position of the aircraft exceeds the predetermined difference value, by controlling the aircraft to return to flying at a position in which the difference between the global position coordinates and the current global position do not exceed the predetermined difference value, wherein the safety device and the flight control device each comprise a respective independent power supply, and wherein interrupting the flight control of the aircraft comprises cutting off the power supply of the flight control device while maintaining power of the safety device.

10. The safety device according to claim 9, wherein the computer hardware is further configured to cause the apparatus to:
determine whether the current global position is outside a second predetermined space incorporating the first predetermined space; and
interrupt flight control of the aircraft when the current global position is determined to be outside of the second predetermined space.

11. The safety device according to claim 10, wherein the first or second predetermined space comprises a cylindrical air space defined by an altitude and a diameter.

12. The safety device according to claim 9, wherein the computer hardware uses a satellite navigation system which differs from a satellite navigation system used by the sensor apparatus.

* * * * *